Patented Feb. 20, 1940

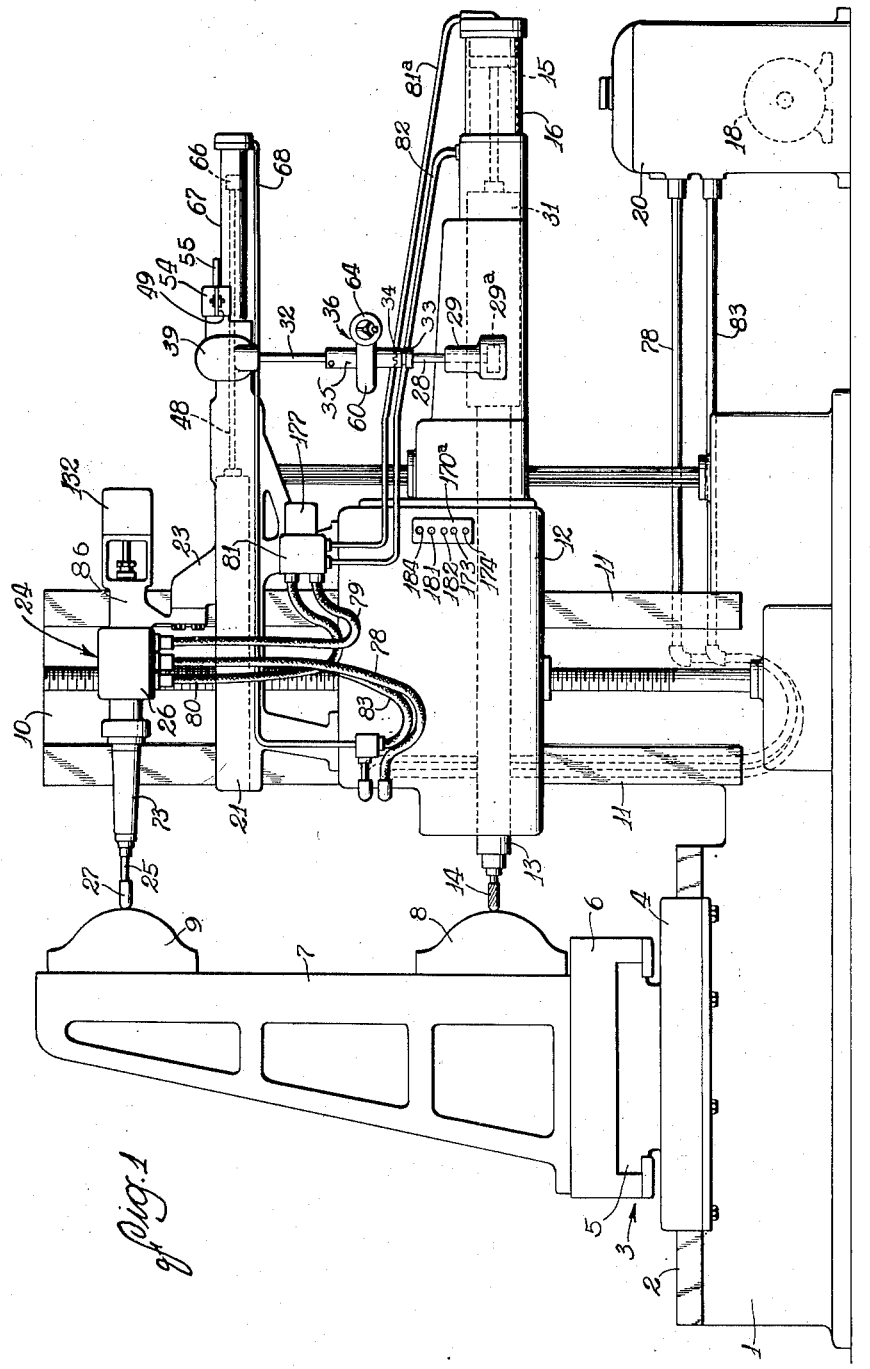

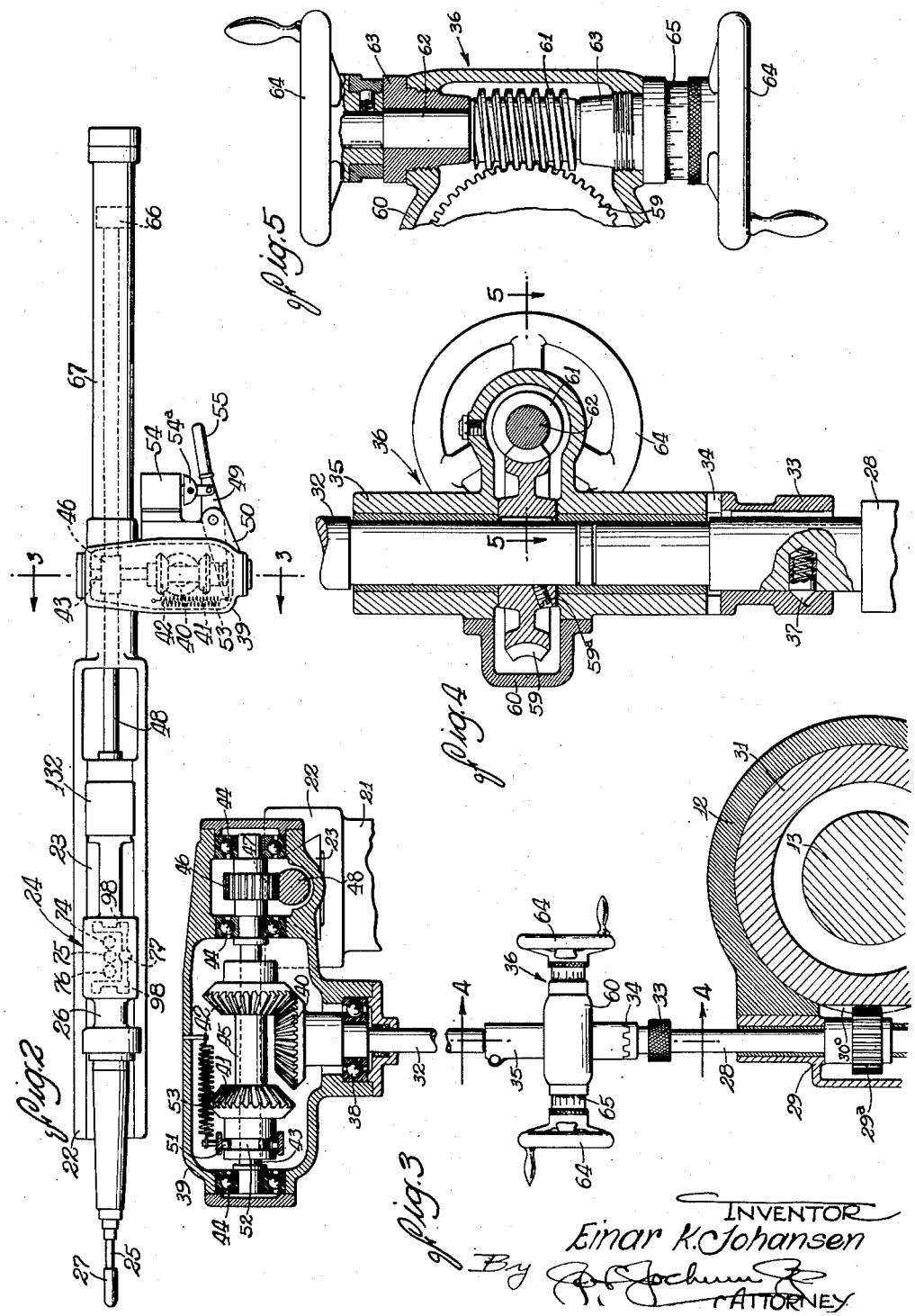

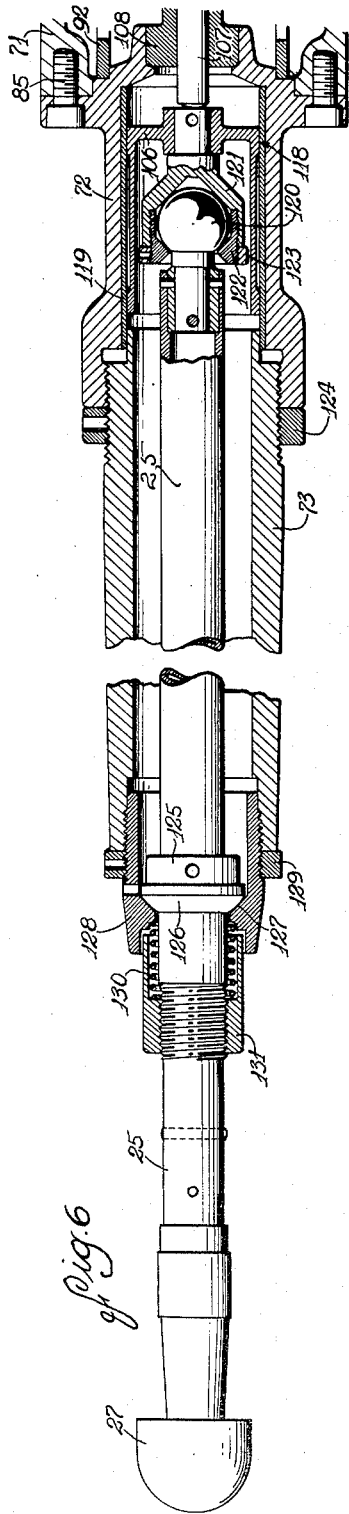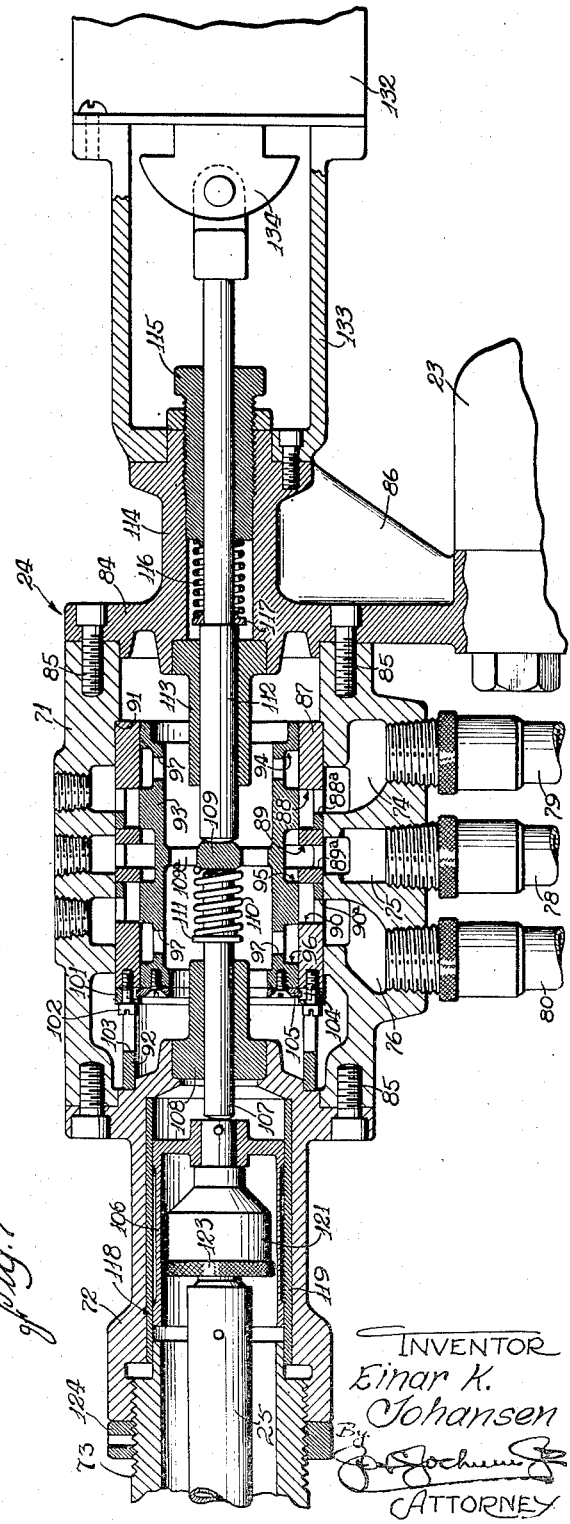

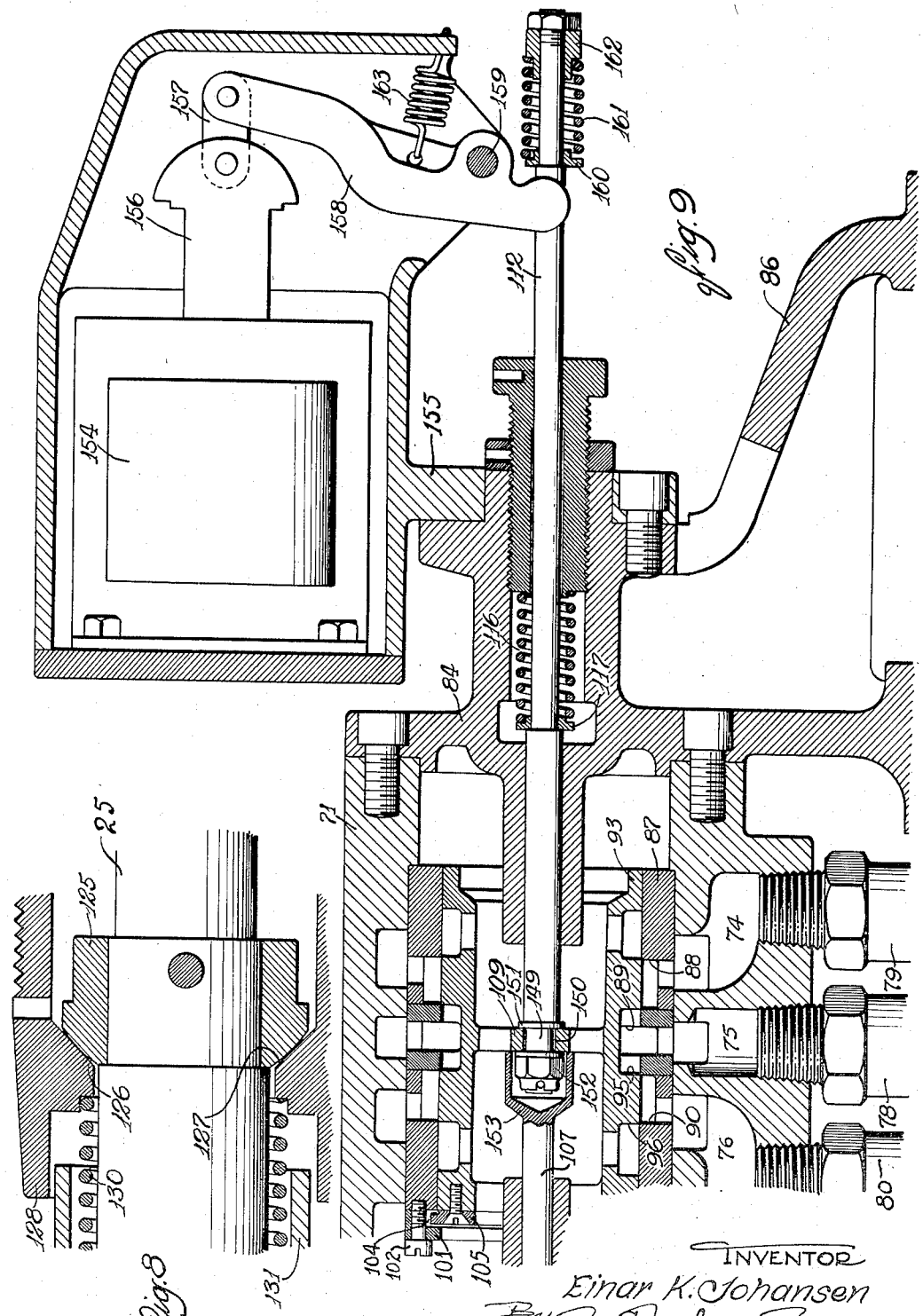

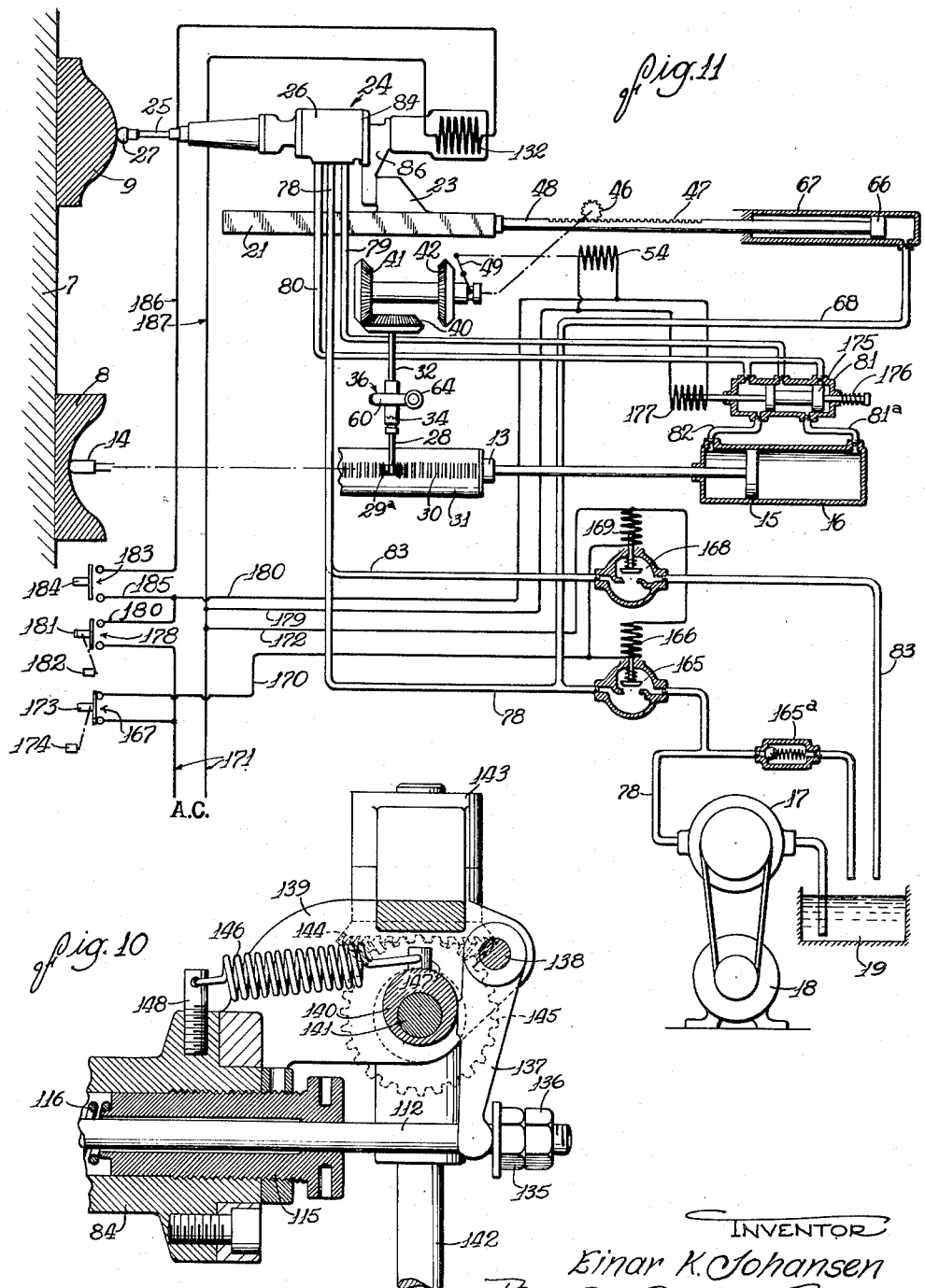

2,190,988

UNITED STATES PATENT OFFICE 2,190,988

DUPLICATING MACHINE

Einar K. Johansen, Chicago, Ill., assignor, by mesne assignments, to The Cincinnati Milling Machine Company, a corporation of Ohio Application January 27, 1937, Serial No. 122,608

11 Claims. (Cl. 90—13.5)

The invention relates to improvements in duplicating machines in which the relative movements of a cutting tool and a work piece are controlled by a tracer moving over the surface of a model or pattern to reproduce the contour of the pattern on the work piece, and it has particular reference to the mechanism and apparatus for controlling such relative movements of the tool and work.

The invention is particularly adapted for use with metal working machines such as milling machines, boring machines, planers, etc., and may be built either as a component part of the machine or as an attachment. Such machines are ordinarily provided with power driven feed mechanism designed to produce relative traversing movements of the tool and work in a series of parallel straight line paths in which the tool operates to form the surface of the work piece. When equipped for duplicating or reproducing a pattern, the machine is provided with additional power actuated feed mechanism for effecting relative movement of the tool and work toward and from each other. The latter feed mechanism is preferably hydraulically operated under control of a tracer through the medium of a suitable valve actuated by an independently movable tracer arm arranged to coact with a pattern. The various elements of the tracer are mounted on a tracer head or slide, the tracer head and pattern being moved relative to each other in exact synchronism with the movements of the tool and work.

In certain types of machines, the work and pattern are moved toward or from the tool and tracer while in other machines, the tool and tracer are moved while the work and pattern are held stationary. The invention is particularly concerned with machines of the latter type and an important object is to provide improved means by which the movements of the tool and tracer may be accurately coordinated and, at the same time, provide the wide range of adjustability between the tool and tracer that is essential for efficient operation.

More particularly stated, it is an object of the invention to provide an improved geared drive mechanism by which movements of the tool are communicated positively and accurately to the tracer and embodying means of an advantageous character for effectively preventing lost motion between the parts due to backlash in the gears.

Another object is to provide a drive mechanism of the above general character embodying means for quickly and accurately adjusting the relative positions of the tool and tracer to place them in exactly the desired relation to the work and pattern, respectively.

Another object is to provide an extremely accurate and sensitive tracer mechanism embodying improved means for supporting a universally movable tracer arm thereby enabling the arm to effect a control operation in response to exceedingly small axial or lateral displacements produced by contact with the surface of a pattern.

Still another object is to provide a tracer valve which is of practical and relatively simple construction and yet extremely accurate and reliable in operation.

A further object is to provide an improved tracer mechanism having means by which the control may be quickly and easily reversed to permit reproduction of patterns either in duplicate or in reverse as desired.

It is also an object of the invention to provide improved electrical control means for duplicating machines whereby the various operations of the machine may be conveniently controlled from a central point through the medium of push buttons or other simple switches.

Other objects and advantages of the invention will become apparent from the following detailed description of the preferred embodiment illustrated in the accompanying drawings, in which:

Figure 1 is a general elevational view of a horizontal boring machine equipped with tracer controlled duplicating mechanism embodying the features of the invention.

Fig. 2 is a plan view of the machine shown in Fig. 1.

Fig. 3 is a view taken along the line 3—3 of Fig. 2 showing the mechanism for drivingly connecting the tool support and the tracer slide.

Fig. 4 is a view taken along the line 4—4 of Fig. 3, showing details of the micrometer adjusting mechanism comprising a part of the connecting mechanism of Fig. 3, on an enlarged scale.

Fig. 5 is a sectional view taken along the line 5—5 of Fig. 4.

Fig. 6 is a longitudinal sectional view of the front portion of the tracer.

Fig. 7 is a longitudinal sectional view of the rear portion of the tracer.

Fig. 8 is a detail sectional view of the tracer arm bearing support.

Fig. 9 is a sectional view of a modified form of the tracer valve and valve control mechanism.

Fig. 10 is a detail view of a modified form of the tracer valve control means.

Fig. 11 is a schematic view showing the hydraulic tracer control circuits and the electrical control therefor.

By way of illustration, the invention has been shown and will be described hereinafter as incorporated in a horizontal boring machine, but it is to be understood that this is not intended as a limitation of the invention to the particular machine disclosed, it being contemplated that various changes and modifications may be made by those skilled in the art to adapt the invention to other types of metal working machines. It will also be understood that various changes in the form, construction and arrangement of the parts may be made without departing from the spirit and scope of the invention as expressed in the appended claims.

Referring more particularly to Fig. 1 of the drawings, the machine selected to illustrate the invention comprises an elongated, horizontally disposed bed 1. The bed is provided at one end with longitudinal guides or ways 2 on which a work support 3 is adapted to travel. The work support comprises a saddle 4 in direct engagement with the ways 2 for movement along the bed 1, and provided with horizontal transverse guides or ways 5 on which a work table 6 is mounted for movement transversely of the bed. As herein shown, the work table 6 carries a vertically disposed angle plate 7 on which are mounted a work piece 8 and a pattern or model 9, the contour of which latter is to be reproduced on the work piece.

Rigidly mounted at the other end of the bed 1 is an upstanding column 10 provided with vertical guides or ways 11 on which a spindle headstock 12 is adapted to travel. The headstock includes a tool support in the form of horizontal spindle 13 projecting on the side adjacent the work support and adapted to carry a cutting tool 14 for operating on the work 8. The rear end of the spindle is operatively connected with a piston 15 operating in a cylinder 16 to which pressure fluid may be introduced selectively to move the spindle and tool toward or from the work.

Suitable power drive means is provided for rotating the tool spindle 13, for feeding the headstock 12 vertically in either direction, and for feeding the work table 6 transversely of the bed in either direction. In addition, a pump 17 (Fig. 11) driven by an electric motor 18 is arranged to supply fluid under pressure to the cylinder 16 for feeding the tool spindle toward or from the work. As shown in Fig. 1, the pump together with the motor 18 and a suitable fluid reservoir or sump 19 is enclosed in a separate casing 20 adapted to be mounted at a convenient location adjacent the machine.

Upon the headstock 12 is rigidly mounted a bracket 21 having a horizontally disposed, dovetailed slideway 22 (Figs. 2 and 3) in which a slide 23 supporting a tracer 24, to be described in detail hereinafter, is mounted for movement parallel to the axis of the spindle 13. The tracer is preferably of the type having a tracer arm 25 mounted for slight universal movement with reference to a head or casing 26 and having a tip 27 shaped substantially like the tool 14 and adapted to engage the surface of the pattern 9 as the tool operates on the work piece 8. Since the tracer head 26 is rigidly mounted on the headstock, the tracer tip and tool necessarily move together with the headstock and in fixed relation as to distance apart so that they describe a series of parallel paths relative to the work and pattern in the combined vertical movements of the headstock and the traversing movements of the work table.

With tracers of the above type, movements of the tool 14 toward and from the work at right angles to the traversing path are controlled in a well known manner by suitable valve means interposed in the hydraulic circuit of the cylinder 16 and adapted to be actuated by the independent movements of the tracer arm 25 incident to the tip 27 encountering either a rise or a depression in the surface of the pattern. Upon such movement of the tool, it is necessary to impart a proportionate movement to the tracer tending to restore the tracer arm to neutral position and maintain the tip 27 in constant, substantially uniform contact with the pattern. The relative direction of the tracer movement is dependent upon whether the work is to be a duplicate of the model or a reverse copy of the same, in the first instance the tool and tracer moving to exactly the same extent or degree and in the same direction, while in the latter instance the tool and tracer are moved in opposite directions.

To coordinate the movements of the tool and tracer, the tracer slide 23 is arranged to be driven directly from the tool spindle 13 by means of a positive geared driving connection interposed between the slide and spindle. Referring more particularly to Figs. 2 and 3, the driving connection comprises, in the present instance, a shaft 28 journaled in a vertical bearing 29 secured to the headstock 12. A pinion 29ª fast on the lower end of the shaft 28 is arranged to mesh with a rack 30 formed on a sleeve 31 adapted to reciprocate with the spindle 13. Thus forward and backward movements of the spindle serve to rotate the shaft 28.

The shaft 28 is disengageably connected with a second shaft 32 in axial alinement with the first mentioned shaft through the medium of a sleeve 33 keyed to the lower shaft and having clutch teeth 34 engageable with complementary teeth on a sleeve 35 on the shaft 32. The sleeve 35 is operatively connected with the shaft 32 through the medium of a micrometer adjusting mechanism 36 by which the angular relation of the shafts may be varied in infinitely small steps as will appear presently. The sleeve 33 is arranged for movement axially to the shaft 28 to engage or disengage the clutch teeth at will, the teeth being disengaged when the machine is to be operated without tracer control. A yieldable detent 37 (Fig. 4) holds the sleeve in clutch engaging position.

The upper end of the shaft 32 is journaled in a suitable bearing 38 supported in a gear box 39 on the rear end portion of the bracket 21. Fast on the upper end of the shaft 32 is a bevel gear 40 adapted to mesh with bevel gears 41 and 42 constituting a reversible clutch mechanism for driving a transverse shaft 43 journaled in antifriction bearings 44 supported in the gear box 39. The gears 41 and 42 are formed integrally with or rigidly secured to a sleeve 45 splined to the shaft 43 for movement axially thereof. A pinion 46 fast on the shaft 43 is arranged to mesh with a rack 47 formed on a rod 48 extending rearwardly from the tracer slide 23. Thus the reciprocatory movements of the spindle 13 are communicated to the tracer slide through the shafts 28 and 32 and the gears 40 and 41 or 40 and 42. The movements of the spindle 13 and slide 23 are in the same direction when the gear 40 is meshed with the gear 42 and in opposite directions when the gear 40 is meshed with the gear 41.

Any suitable means may be employed for shifting of the gears 41 and 42. As herein shown, this means comprises a lever 49 (Fig. 2) pivoted on a bracket 50 formed on the gear box 39. One end of the lever 49 is formed with two legs adapted to straddle the hub of the gear 41, each leg having a pin 51 engaging in an annular groove 52 formed in the hub of the gear. Thus the gears 41 and 42 may be shifted axially of the shaft 43 to cause one or the other to mesh with the driving gear 40 by rocking the lever 49 about its pivot. A spring 53 secured to a rearward extension of the lever is normally operative to hold the gears 40 and 41 in mesh. A solenoid 54 having its armature 54a suitably secured to the other end of the lever 49 operates when energized to shift the gear assembly and mesh the gear 42 with the driving gear 40 for reverse operation of the machine. This reversing operation may also be effected manually when desired through the medium of a handle 55 constituting an extension of the lever 49.

Referring now to Figs. 4 and 5, the micrometer adjusting mechanism 36 comprises a worm wheel 59 keyed to the lower end of the shaft 32 and rigidly held in place thereon by a set screw 59a disposed opposite the keyway. The worm wheel is enclosed in an annular housing 60 formed integral with or rigidly secured to the sleeve 35. Meshing with the worm wheel 59 is a worm 61 fast on a transverse shaft 62 journaled in bearings 63 mounted on the housing 60. In the present instance, the bearings 63 are threaded into the housing so that they may be conveniently adjusted to remove all end play from the shaft 62. The shaft 62 is provided at opposite ends with hand wheels 64 by which it may be rotated and, through the action of the worm 61 and worm wheel 59, thus rotate the sleeve 35 relative to the shaft 32. Since the sleeve 35 is drivingly connected with the shaft 28 through the clutch teeth 34, it will be apparent that this operation serves to rotate the shaft 32 relative to the shaft 28. This movement is communicated to the tracer slide in the usual way so that the relative positions of the tracer tip 27 and the tool 14 may be varied accurately in infinitely small steps to accurately position them in desired relationship to the pattern and the work. Accurate adjustment is facilitated by the provision of a graduated scale 65 on the hub of each of the hand wheels 64.

The micrometer adjustment above described may be utilized to advantage in initially setting up the machine as it makes it unnecessary to place the pattern in exactly the same plane as the work piece. After the work and pattern are mounted on the support 7, the tool 14 may be advanced into contact with the work independently of the tracer by disengaging the clutch 34. The clutch is then engaged and the tracer tip advanced into contact with the pattern by manipulating the hand wheel 64. When the tracer is to be moved through a considerable distance, this may be done conveniently and rapidly by disengaging the clutch 34 and rotating the entire micrometer mechanism. The clutch 34 is then engaged and the tracer tip is backed away from the pattern by operating the hand wheel 64. The extent of this backward movement determines the depth of the cut taken by the tool 14 in the surface of the work piece.

For precision work it is essential for the tracer to follow the movements of the tool exactly, as any lost motion between these parts will necessarily result in inaccurate reproduction. Means is provided in the present instance for eliminating all possibility of such loss of motion by effectually taking up the play and backlash in the gears, clutch and other parts of the spindle and slide connecting mechanism. To this end, the rod 48 by which the tracer slide 23 is driven, is provided at its rear end with a piston 66 operating in a closed cylinder 67 supported on the bracket 21. Provision is made for supplying pressure fluid to the rear end of the cylinder through a duct 68 (Figs. 1 and 11) so that when the machine is in operation, the piston is continuously yieldably urged in a direction tending to move the slide 23 and tracer toward the pattern. With this arrangement all backlash in the gears and clutch mechanism is taken up and the tracer and the tool spindle are moved together and in exactly the same degree either in the same or in opposite directions. The forward and backward movement of the tool spindle and slide are controlled by a tracer mechanism, and while the said tracer mechanism forms the subject matter of my copending application filed June 21, 1937, Serial Number 149,370, the specific construction and operation thereof will be here described so as to convey a complete and clear understanding of the entire mechanism and its associated parts and the operation thereof.

Referring therefore to Figs. 6 and 7, the tracer 24 comprises an elongated hollow casing constructed in the present instance in three sections 71, 72 and 73 rigidly secured together to form a unitary tracer head structure. The section 71 disposed at the rear end of the assembly constitutes a housing for the tracer valve and to this end is provided with a series of three ports 74, 75 and 76 arranged in a line extending longitudinally of the casing. A fourth port 77 is located at one side of the port 75 as will be seen by reference to Fig. 2 of the drawings.

Connecting with the port 75 is a duct 78 leading from the discharge or pressure side of the pump 17 as shown in Fig. 11. Ducts 79 and 80 extend from the ports 74 and 76, respectively, to a reversing valve 81 which, in turn, is connected with opposite ends of the spindle actuating cylinder 16 by ducts 81a and 82. A discharge duct or drain 83 extends from the port 77 to the sump 19.

The casing section 71 is closed at one end by the section 72 and at the other end by an end plate 84, the several parts being rigidly secured together as by bolts 85. As herein shown, the end plate 84 is provided with a depending arm 86 constituting a bracket for supporting the casing structure on the slide 23.

Enclosed within the casing 71 is a cylindrical sleeve 87 formed with accurately spaced, internal circumferential grooves 88, 89 and 90 communicating respectively with the ports 74, 75 and 76 through apertures 88a, 89a and 90a extending through the sleeve. As herein shown, the sleeve 87 is constructed in three parts to facilitate manufacturing within the extremely close limits essential for this type of mechanism. The sleeve is fitted tightly in the casing section 71 and held rigidly in place against an internal shoulder 91 on the casing wall by an annular member 92 carried on the end of the casing section 72 and disposed so as to abut against the end of the sleeve. With this construction, accurately dimensioned openings for the ports 74, 75 and 76 are readily obtained with ordinary manufacturing processes.

Communication between the several ports in the casing is controlled by a hollow, cylindrical valve member 93 slidably mounted for endwise movement in the sleeve 87. The valve member is formed with accurately spaced peripheral grooves 94, 95 and 96 adapted to cooperate with the grooves 88, 89 and 90 in defining passages between the ports. The outermost or end grooves 94 and 96 are provided with apertures 97 communicating with the interior of the member and thus with the discharge port through the medium of suitable channels 98 formed in the casing wall as shown in Fig. 2.

Preferably, the grooves in the member 93 are so positioned that, when the member is in intermediate or neutral position as shown in Fig. 7, the openings for the ports 74, 75 and 76 are tightly closed to prevent the flow of pressure fluid through the valve. When the valve member is moved to the right as viewed in the drawings, the groove 95 connects the ports 75 and 74 so as to direct pressure fluid from the duct 78 into the duct 79. At the same time, the port 76 is connected with the port 77 by way of the groove 96 and apertures 97. Movement of the valve member 93 in the other direction from neutral position connects the port 75 with the port 76 and likewise connects the port 74 with the port 77. Thus, by small movements of the valve member, the ducts 79 and 80 leading to the spindle actuating cylinder 16 may be connected selectively with the pressure duct 78 or the drain duct 83.

Suitable means is provided for confining the movements of the valve member 93 within predetermined limits. As herein shown, this means comprises an annular member 101 secured to the end of the sleeve 87 adjacent the retaining member 92 by screws 102, the retaining member being slotted as at 103 to accommodate the heads of the screws. The member 101 is formed with an accurately dimensioned internal peripheral notch 104 adapted to receive an annular member 105 rigidly secured to the valve member 93. The depth of the slot 104 is greater than the thickness of the member 105, the difference representing the range of movement of the member in the slot and therefore the range of movement of the valve member.

When the machine is in operation, movements of the valve member 93 are controlled by the tracer arm 25, through the medium of a valve actuating member 106 slidably mounted for endwise movement in the casing section 72. In the embodiment shown in Fig. 7 of the drawings, a push rod 107 slidably supported in a gland 108 mounted in the end of the casing section 72 provides an operative connection between the valve member and the actuating member. The push rod bears against a pad 109 on a transverse web 109a rigid with the valve member, the pad being disposed substantially centrally of and coaxially in the member. A compression spring 110 interposed between the pad 109 and a collar 111 anchored to the push rod tends to urge the rod and valve member apart for reasons that will appear presently.

Bearing against the opposite side of the pad 109 is a second push rod 112 slidably supported in a gland 113 mounted on the end plate 84. The rod 112 extends rearwardly through a tubular extension 114 of the end plate and through a hollow adjusting screw 115 threading into the same. A compression spring 116 interposed between the end of the screw 115 and a collar 117 abutting against a shoulder on the push rod, urges the rod to the left as viewed in Fig. 7 and thus tends to shift the valve member to the left against the action of the spring 110. The spring 116 is of heavier construction than the spring 110 so that the pad 109 is normally held in tight engagement with the push rod 107 and the latter is urged to the left against the actuating member 106. The pressure exerted by the spring 116 may be readily adjusted by turning the screw 115.

The impositive connection between the valve member 93 and the operating elements provided by the construction above described makes it unnecessary to aline the push rod bearings exactly with the bore of the valve member, thus materially simplifying the manufacture and assembly of the parts. The valve member is enabled to move freely without binding and consequently responds more quickly and accurately to slight movements of the actuating member 106 under the influence of the tracer arm 25.

The valve actuating member 106 is preferably of hollow cylindrical construction and is provided at each end with a peripheral bearing surface 118 for sliding engagement with the walls of a cylindrical hardened steel bearing member 119 mounted in the casing section 72. As shown in Fig. 6, the tracer arm 25 is operatively connected with the actuating member 106 by means of a ball and socket joint comprising a ball member 120 rigidly mounted on the inner end of the tracer arm and a socket 121 supported within and substantially centrally of the actuating member so that the assembled parts occupy a minimum of space and yet provide a relatively long and firm bearing for the same. An annular retaining ring 122 threaded into the open end of the socket and locked in place by a suitable lock nut 123 maintains the ball 120 securely in the socket.

The tracer arm 25 extends entirely through the tubular casing section 73 which is threaded into the end of the section 72 and locked in place by a nut 124 to provide a convenient means for adjusting the overall length of the casing structure. Mounted intermediate the ends of the tracer arm adjacent the forward end of the section 73 is a bearing element 125 having a spherically formed bearing surface 126 adapted to coact with an inclined bearing surface 127 formed within a hollow cylindrical stationary bearing element 128 threaded into the end of the casing section 73. The interior diameter of the element 128 is sufficiently greater than the diameter of the tracer arm and the element 125 so that the arm may be rocked about the pivot provided by the ball and socket joint when pressure is exerted laterally on the tracer tip 27. A nut 129 threaded on the bearing element prevents accidental movement of the element relative to the casing.

As shown in Fig. 8, the relative positioning of the bearing surfaces 126 and 127 is such that when the tracer arm 25 is rocked about its pivot, the bearing surface 126 rides up on the inclined surface 127 and shifts the tracer arm axially a distance determined by the degree of deflection of the arm. The bearing 125 is normally centered in the bearing 128 by a compression spring 130 enclosed in a cap or guard 131 threaded on the tracer arm and bearing against the end of the element 128. The pressure exerted by the spring on the tracer arm may be varied by rotating the cap and determines the force required to rock the tracer arm out of normal or intermediate position.

It will be appreciated that the tracer arm 25 may be moved axially as well as laterally by reason of the tip 27 encountering a rise in the surface of the pattern. In either case, the valve actuating member 106 is moved endwise a proportionate amount and acts through the push rod 107 to position the valve member 93. The relative positioning of the several parts is extremely important and these are preferably adjusted so that the valve member 93 may be shifted to its extreme forward operative position by the spring 116 and push rod 112 when the bearing 126 is exactly centered in the bearing 127 and in engagement therewith. A slight rearward movement of the tracer arm produced by either axial or lateral pressure of the pattern against the tip 27 serves to shift the valve member to neutral position. Further movement of the tracer arm shifts the valve member to its other operative position in which the hydraulic circuit connections are reversed. Adjustment of the several parts is quickly and accurately effected by rotation of the casing section 73 relative to the section 72 and by rotation of the bearing element 128 relative to the casing section 73.

When the machine is in operation, the tip 27 is held in constant, substantially uniform contact with the surface of the pattern 9. The contact pressure is determined by the adjustment of the springs 116 and 130. When the tip enters a depression in the pattern, the valve member 93 follows under the influence of the spring 116 and positions the valve ports so as to produce an appropriate movement of the tool 14. When the tip 27 encounters a rise on the surface of the pattern, the tracer arm is shifted rearwardly to vary the position of the valve member in the reverse direction.

The tool and tracer may be backed away from the work and pattern under manual control when they are to be shifted to new traversing paths. To this end means is provided for moving the valve member 93 to its rearward position independently of the tracer arm. In the embodiment shown in Fig. 7, this means comprises a solenoid 132 supported on a bracket 133 mounted on the end plate 86 of the casing and having its armature 134 operatively connected with the projecting end of the push rod 112. When energized, the solenoid 132 draws the push rod out of engagement with the pad 109 on the valve member whereby the spring 110 is rendered effective to shift the valve member to the right. Upon deenergization of the solenoid, the push rod 112 is shifted back into engagement with the pad 109 by the spring 116 and the valve member is returned to the position determined by the position of the tracer arm.

Fig. 10 shows a modified valve controlling mechanism wherein the push rod is moved out of engagement with the valve member by manually operable means. In this construction, a nut 135 is threaded on the projecting end of the push rod 112 and is locked in place by a second nut 136. The nut 135 constitutes a thrust bearing for engagement with the free end of a crank arm 137 carried by a shaft 138 rotatably supported on a bracket 139 on the end plate 84. A cam 140 fast on a shaft 141 also journaled in the bracket 139 is arranged to engage the crank arm 137 intermediate its ends. The cam is shaped so that when the shaft 141 is rotated, crank arm 137 is rocked between a forward position in which the push rod is disengaged from the arm, to a rearward position in which the push rod is shifted to the right sufficiently to permit the valve member 93 to move to its rearmost position under the influence of the spring 110.

For rotation of the shaft 141, a vertical shaft 142 journaled at its upper end in a bearing 143 mounted on the bracket 139 carries a bevel gear 144 meshing with a bevel gear 145 fast on the shaft 141. Any suitable means such as a manually operable lever (not shown) may be utilized to rotate the shaft 142. As herein shown, a spring 146 anchored at one end to a pin 147 projecting transversely from shaft 141 and at the other end to a pin 148 threaded into the end plate 84 acts to normally maintain the low point of the cam 140 in engagement with the arm 137. Thus, the push rod 112 is normally free to move through its full stroke without interference. When the shaft 141 is rotated through a quarter turn, cam 140 operates through the arm 137 to shift the push rod and valve member 93 to neutral position. A further quarter turn of the shaft 141 shifts the valve member to its extreme rearward position.

A further modification of the tracer valve actuating mechanism is shown in Fig. 9. In this embodiment, the valve member 93 is moved positively to its rearward position when it is desired to back the tool and tracer away from the work and pattern. To this end, the push rod 112 is formed with a reduced inner end portion 149 adapted to extend through a slightly larger aperture 150 in the pad 109 and is loosely clamped thereto by a washer 151 abutting against a shoulder on the rod and a nut 152 threaded on the end of the rod. The nut 152 is turned up sufficiently tight to take up substantially all end play between the rod and the valve member and yet permit lateral shifting of the parts so that the push rod may readily center itself with respect to the valve member without causing the member to bind in the sleeve 87.

The push rod 107 is also modified in this instance by the provision of an enlarged hollow end portion 153 adapted to fit over the nut 152, thereby permitting the push rod to bear directly against the pad 109. No compression spring corresponding to the spring 110 is required in this construction.

Any suitable means may be employed for withdrawing the push rod 112 to its rearward position to shift the valve member 93. As herein shown, a solenoid 154 is provided for this purpose. The solenoid is mounted on a bracket 155 supported on the end plate 84 of the casing structure and its armature 156 is connected by a link 157 with one end of a lever 158 pivotally supported at 159 on the bracket 155.

The other end of the lever 158 is positioned for engagement with a sleeve 160 slidably supported on the push rod 112 and yieldably connected therewith by a spring 161 interposed between the sleeve and a nut 162 threaded on the outer end of the rod.

The spring 161 is sufficiently stiff so that when the lever 158 is rocked by energization of the solenoid 154, push rod 112 is shifted rearwardly against the action of the spring 116 until the valve member 93 reaches its limit position. Further movement of the lever shifts the sleeve 160 axially of the push rod against the action of the spring 161. With this construction, the solenoid armature 156 is enabled to make a full stroke without necessitating accurate adjustment of such stroke with reference to the stroke of the valve member. A coiled spring 163 connecting between the lever 158 and the bracket 155 withdraws the lever from engagement with the sleeve 160 upon deenergization of the solenoid and the push rod is returned to normal position by the spring 116.

Having in mind the mechanical construction and arrangement of the various elements of the machine as above set forth, the electrical and hydraulic circuits provided for operating and controlling the machine will now be described. Referring to Fig. 11, it will be observed that a valve 165 is interposed in the pressure duct 78 between the pump 17 and the tracer 24. The valve 165 is biased to a normally closed position and is provided with an operator in the form of a solenoid 166 adapted to be energized by the closure of a switch 167. A similar valve 168 having an operating solenoid 169 connected in multiple with the solenoid 166 is interposed in the drain duct 83 between the tracer 24 and the sump 19.

The valve 165, when closed, shuts off the supply of pressure fluid from the tracer and thus terminates tracer control of the tool. Pressure fluid delivered by the pump 17 is then discharged through a suitable relief valve 165ª and returned to the sump 19. The valve 168, which is closed at the same time as the valve 165, prevents draining of the pressure fluid from the tracer and other elements of the hydraulic system.

The valve controlling switch 167 is adapted when closed to connect a conductor 170 extending from the common terminals of the solenoids 166 and 169 to one side of a current supply line 171. The other terminals of the solenoids are connected to the other side of the line 171 by a common conductor 172. A push button 173 is provided for closing the switch 167, the switch being opened by the actuation of a companion push button 174. In practice, the push buttons 173 and 174 are designated as "Run" and "Stop" buttons, respectively, and are mounted on a suitable control panel 170ª (Fig. 1) within easy reach of the attendant thus providing convenient centralized control of the operation of the machine.

The reversing valve 81 hereinbefore referred to as interposed between the tracer 24 and the tool spindle actuating cylinder 116 controls the operative effect of the tracer with respect to the tool spindle. This valve comprises a reciprocable valve member or plunger 175 normally biased to the position shown in the drawings by a spring 176. When the valve plunger is in this position, the duct 79 is connected with the duct 81ª and the duct 80 is connected with the duct 82. Thus, when the valve member 93 of the tracer is shifted forwardly by a movement of the tracer arm toward the pattern, pressure fluid is directed via the ducts 78, 80 and 82 into the forward end of the cylinder 16 and the tool spindle 13 and tool 14 are moved backwardly from the work. Spent pressure fluid is discharged from the rear end of the cylinder through the ducts 81ª, 79 and 83 and returned to the sump 19. Thus, the tool and tracer move in opposite directions so that the contour of the pattern is reproduced in reverse on the work piece.

Any suitable means may be employed for shifting the valve plunger 175 from its normal position to its alternate position in which the pressure fluid connections to the cylinder 16 are reversed. As herein shown, a solenoid 177 is provided for this purpose and is arranged to be energized by the closure of a switch 178 over a circuit extending from one side of the line 171, conductor 179, winding of the solenoid 177, conductor 180 and switch 178 to the other side of the line 171. The clutch operating solenoid 54 is connected across the conductors 179 and 180 in multiple with the solenoid 177 so that the drive mechanism for the tracer slide 23 is automatically set for proper operation simultaneously with the setting of the reversing valve.

The switch 178 is arranged to be closed by actuation of a push button 181 and to be opened by actuation of a companion push button 182. These push buttons may be designated respectively as the "Normal" and "Reverse" buttons and are preferably mounted on the control panel adjacent the push buttons 173 and 174 for convenient access by the attendant.

An additional switch 183 operable by a push button 184 designated the "Back" push button is provided on the control panel for controlling the tracer solenoid. The circuit controlled by this switch is interlocked with the valve operating circuit controlled by the "Normal" and "Reverse" switch 178 so that the tracer solenoid cannot be energized when the machine is set for reverse operation and thus cause the tool to be fed toward the work. To this end, the energizing circuit of the tracer solenoid 132 is taken from one side of the line 171 through the "Normal" switch 178, conductor 180, branch conductor 185, "Back" switch 183, conductor 186, winding of the solenoid and back to the other side of the line 171 over a conductor 187. Thus, damaging of the tool or work by accidental or inadvertent closure of the "Back" switch 183 is effectually avoided.

It will be apparent from the foregoing that the invention provides a duplicating machine of improved construction adapted to reproduce a pattern in duplicate or reverse with extreme accuracy. The machine embodies tracer mechanism which is of sturdy and relatively simple construction and yet accurate and sensitive in operation. An efficient and positively acting gear mechanism is provided for communicating the movements of the tool spindle to the tracer with an entire absence of lost motion between these parts which materially improves the accuracy of reproduction. The machine is arranged for convenient centralized control enabling the attendant to start and stop the machine, change from normal to reverse operation, or back the tool away from the work independently of the tracer by simply manipulating conveniently located push buttons. Moreover, the controls are effectively interlocked to prevent damage to the tool or work by accidental or inadvertent operation of the control switches.

I claim as my invention:

1. In a metal working machine, in combination, a tool and a tracer mounted in fixed spaced relation as to distance apart, a support on which a work piece and a pattern are mounted in substantially the same spaced relation as said tool and said tracer, means for causing a relative traverse of the work piece by the tool and of the pattern by the tracer in a straight path across the respective surfaces thereof, said tool and said tracer being mounted on individual supports for independent movement toward and from the work and pattern at an angle to the traversing path, power actuated means controlled by said tracer for moving the tool and its support toward or from the work, a gear mechanism connecting the tool support and the tracer support for positively communicating the movements of the tool support to the tracer support to move the tracer toward and from the pattern, and means for taking up the backlash in the gears of said mechanism to prevent lost motion between said supports comprising means operating directly upon and continuously yieldably urging said tracer slide in one direction.

2. In a metal working machine, in combination, a tool and a tracer mounted in fixed spaced relation as to distance apart, a support on which a work piece and a pattern are mounted in substantially the same spaced relation as said tool and said tracer, means for causing a relative traverse of the work piece by the tool and of the pattern by the tracer in a straight path across the respective surfaces thereof, said tool and said tracer being mounted on individual supports for independent movement toward and from the work and pattern at an angle to the traversing path, hydraulically operated means controlled by the tracer for moving the tool and its support toward and from the work, connecting means interposed between the tool and tracer supports for positively communicating the movements of the tool support to the tracer support, and means for preventing lost motion between said supports comprising hydraulically operated means operating directly upon and continuously urging said tracer support toward the pattern independently of said connecting means.

3. In a metal working machine, in combination, a tool and a tracer mounted in fixed spaced relation as to distance apart, a support on which a work piece and a pattern are mounted in substantially the same spaced relation as said tool and said tracer, means for causing a relative traverse of the work piece by the tool and of the pattern by the tracer in a straight path across the respective surfaces thereof, said tool and said tracer being mounted on individual supports for independent movements toward and from the work and pattern at an angle to the traversing path, hydraulically operated means controlled by the tracer for moving the tool and its support toward and from the work, connecting means interposed between the tool and tracer supports for positively communicating the movements of the tool support to the tracer support, and means for taking up any play in said connecting means to enable the supports to move together without lost motion, said means comprising a stationarily mounted cylinder, a piston reciprocable in said cylinder and operatively connected with the tracer support to operate directly thereupon, and means for supplying pressure fluid to one end of the cylinder to continuously yieldably urge said tracer support toward the pattern against the action of said connecting means.

4. In a duplicating machine, in combination, a tool and a tracer mounted on individual supports in fixed spaced relation as to distance apart for cooperating respectively with a work piece and a pattern, said supports being independently movable toward and from the work piece and pattern, power actuated means controlled by the tracer for moving one of said supports, a geared driving connection interposed between the supports for communicating the movements of said one support to the other support, and means operating directly upon and continuously yieldably urging said other support in one direction to take up backlash in the gears of said driving connection and thereby enable the two supports to move together without lost motion.

5. In a duplicating machine, in combination, a tool and a tracer mounted on individual supports in fixed spaced relation as to distance apart for cooperating respectively with a work piece and a pattern, said supports being independently movable toward and from the work piece and pattern, power actuated means controlled by the tracer for moving one of said supports, means for communicating the movements of said one support to the other support, and means for preventing lost motion between said supports comprising hydraulic means operating directly upon and continuously yieldably urging said other support in one direction.

6. In a duplicating machine, in combination, a tool and a tracer mounted on individual supports in fixed spaced relation as to distance apart for cooperating respectively with a work piece and a pattern, said supports being mounted for independent movement toward and from the work piece and pattern, respectively, power actuated means controlled by the tracer for moving one of said supports, mechanical means including a reversible clutch device connecting said supports for moving the other support simultaneously with and in either the same direction or opposite directions to the movement of said one support, and means operating directly upon one of said supports for taking up the lost motion in said mechanical means and clutch device to insure movement of said supports in exactly the same degree.

7. In a duplicating machine having a tool support and a tracer support mounted for independent movement, power actuated means for moving one support, connecting means interposed between said supports for positively communicating the movements of said one support to the other support, said connecting means including a pair of axially alined shafts having driving connections with the respective supports, and adjustable coupling means operatively connecting said shafts, said coupling means comprising a sleeve member fast on one shaft, a casing member rotatably mounted on the other shaft and having a driving connection with said sleeve member, a worm wheel keyed to said other shaft and enclosed within said casing, a worm mounted on said casing and adapted to engage said worm wheel thereby providing a driving connection between the casing and said other shaft, and means for operating said worm to rotate said worm wheel and said other shaft relative to said one shaft to vary the relative positions of said supports.

8. In a duplicating machine, in combination, a cutting tool, hydraulically operated means for moving it toward and from a work piece, a tracer adapted to cooperate with a pattern as the tool operates on the work piece, valve means operable by said tracer for controlling the supply of pressure fluid to said hydraulically operated means to vary the position of said tool relative to the work piece, said valve comprising a valve member movable from a neutral position into either of two operative positions effective respectively to cause the tool to be moved toward and from the work piece, means for reversing the operative effect of said valve member with respect to said hydraulically operated means, a solenoid adapted when energized to move said valve member to one operative position independently of the tracer, and means for maintaining the said solenoid against energization when said reversing means is operated.

9. In a duplicating machine, in combination, a tool and tracer mounted on individual supports in fixed spaced relation as to distance apart for cooperating with a work piece and a pattern, said supports being mounted for independent movement toward and from the work and pattern respectively, power actuated means for moving the tool support toward and from the work, mechanical means including a reversible clutch device connecting said supports operative to move the tracer support simultaneously with and in either the same or opposite directions to the movement of said tool support, control means operated by said tracer for controlling said power actuated means to determine the direction and extent of movement of the tool support, reversing means interposed between said control means and said power actuated means for reversing the operative effect of the control means on said power actuated means, and electrically operated means for simultaneously operating said reversing means and said clutch device to properly coordinate the tool and tracer movements.

10. In a duplicating machine, in combination, a tool and tracer mounted on individual supports in fixed spaced relation as to distance apart for cooperating with a work piece and a pattern, said supports being mounted for independent movement toward and from the work and pattern respectively, hydraulic means for moving the tool support toward and from the work, mechanical connecting means including a reversible clutch device connecting said supports operative to move the tracer support simultaneously with and in either the same or opposite directions to the movements of said tool support, valve means operable by the tracer for controlling the supply of pressure fluid to said hydraulic means to determine the direction and extent of movement of the tool support, a reversing valve interposed between said valve means and said hydraulic means for reversing the operative effect of said valve means on said hydraulic means, and electrically operated means for simultaneously operating said reversing valve and said clutch device to properly coordinate the movements of the tool and tracer.

11. In a duplicating machine, a cutting tool slide, a tracer slide carrying a tracer, said tracer adapted to follow the contour of a pattern, a positive and operative connection between the tool and tracer slides, whereby the movement of one toward and away from its operating plane will cause a similar movement of the other, means individual to the tool and tracer slides for moving them, one of the said means operating to cause the said connecting means to move the other slide, and the other of said means operating to continuously urge its slide in one direction, the last said means also operating to compensate lost motion in the said connection, and means for selectively causing the tool and tracer slides to move in the same, or in opposite directions with respect to each other.

EINAR K. JOHANSEN.